United States Patent [19]

Urabe et al.

[11] Patent Number: 5,181,182
[45] Date of Patent: Jan. 19, 1993

[54] MULTI-LEVEL BAND-RESTRICTED WAVEFORM GENERATOR

[75] Inventors: Kenzo Urabe, Sendai; Yoshihiko Akaiwa, Munakata, both of Japan

[73] Assignee: Kokusai Electric Co., Ltd., Tokyo, Japan

[21] Appl. No.: 813,806

[22] Filed: Dec. 26, 1991

[51] Int. Cl.$^5$ .............................................. G06F 1/02
[52] U.S. Cl. .................................. 364/718; 328/14
[58] Field of Search ........................ 364/718–722; 328/14

[56] References Cited

U.S. PATENT DOCUMENTS 4,338,674  7/1982  Hamada .................. 364/718
4,809,577  3/1989  Fujita ........................ 84/604
4,878,194 10/1989  Nakatsugawa et al. ......... 364/718
4,992,743  2/1991  Sheffer ........................ 328/14

Primary Examiner—Tan V. Mai
Attorney, Agent, or Firm—Emmanuel J. Lobato; Robert E. Burns

[57] ABSTRACT

A multi-level band-restricted waveform generator in which a modulation wave prior to band restriction (M-level signal sequence) is broken into elementary waveforms and a plurality (N-nary) of prestored waveform components corresponding to the elementary waveforms after predetermined band restrictions are read out of a read-only memory for generating waveform components and added to generate a desired multi-level band-restricted waveform.

2 Claims, 3 Drawing Sheets

MULTI-LEVEL BAND-RESTRICTED WAVEFORM GENERATOR

BACKGROUND OF THE INVENTION

The present invention relates to improvements in or relating to a multi-level, band-restricted waveform generator for generating a band-restricted waveform of a multi-level signal sequence, which is employed to produce various multi-level modulated signal waveforms of a multi-value amplitude, a multi-level phase and a multi-level frequency in a modem for data transmission over a wire or radio line with band limitation.

There have heretofore been used an analog or digital filtering method which directly applies the multi-level square wave sequence signal to an analog or a digital low-pass filter for band restriction, and a waveform table ROM method according to which, with respect to all combinations of k symbols (k being impulse response symbol lengths), the waveform corresponding to the k-th symbol after the band restriction is precalculated on off line basis and prestored in a ROM (Read Only Memory) as a waveform table and is then read out therefrom for D/A conversion.

With the analog or digital filtering method, however, the low-pass filter for band restriction use is usually high-order, and hence is large in the scale of its circuit structure, and when the low-pass filter is formed by an analog element, it calls for compensation for an environmental change and time aging and fine adjustment and is not suitable for fabrication as an IC. Thus, the low-pass filter has difficulties in miniaturization, economization and stabilization. If the low-pass filter is implemented by a digital signal processing device as a digital filter through utilization of A/D and D/A conversion techniques, its stabilization can be achieved but its circuit scale and power consumption will be large.

On the other hand, the digital processing method utilizing the waveform table ROM is generally excellent in terms of miniaturization, economization and stabilization, but letting the number of samples per symbol be represented by S, the capacity of the ROM (i.e. the number of memorized words for D/A conversion) is $S \cdot M^k$ words. Hence, as k and M increase, the capacity becomes enormous, and consequently, this method is impractical when k is comparably large.

SUMMARY OF THE INVENTION

An object of the present invention is to provide a method for generating a multi-level band-restricted waveform generator for generating the multi-level band-restricted waveform through digital processing, which solves the problems of miniaturization, economization and stabilization encountered in the conventional analog or digital filtering method and diminishes the defect of an exponential increase in the memory capacity faced with in the conventional waveform table ROM method.

To attain the above object of the present invention, the present invention is based on a method in which the modulation wave prior to the band restriction (the M-level signal sequence) is broken down into elementary waveforms and a plurality (N-nary) of prestored waveform components corresponding to the elementary waveforms after a predetermined band restriction are read out of a waveform component generating ROM and added to generate a desired multi-level band-restricted waveform.

BRIEF DESCRIPTION OF THE DRAWINGS

The present invention will be described with reference to the accompanying drawings, in which.

DETAILED DESCRIPTION

Figure 1:
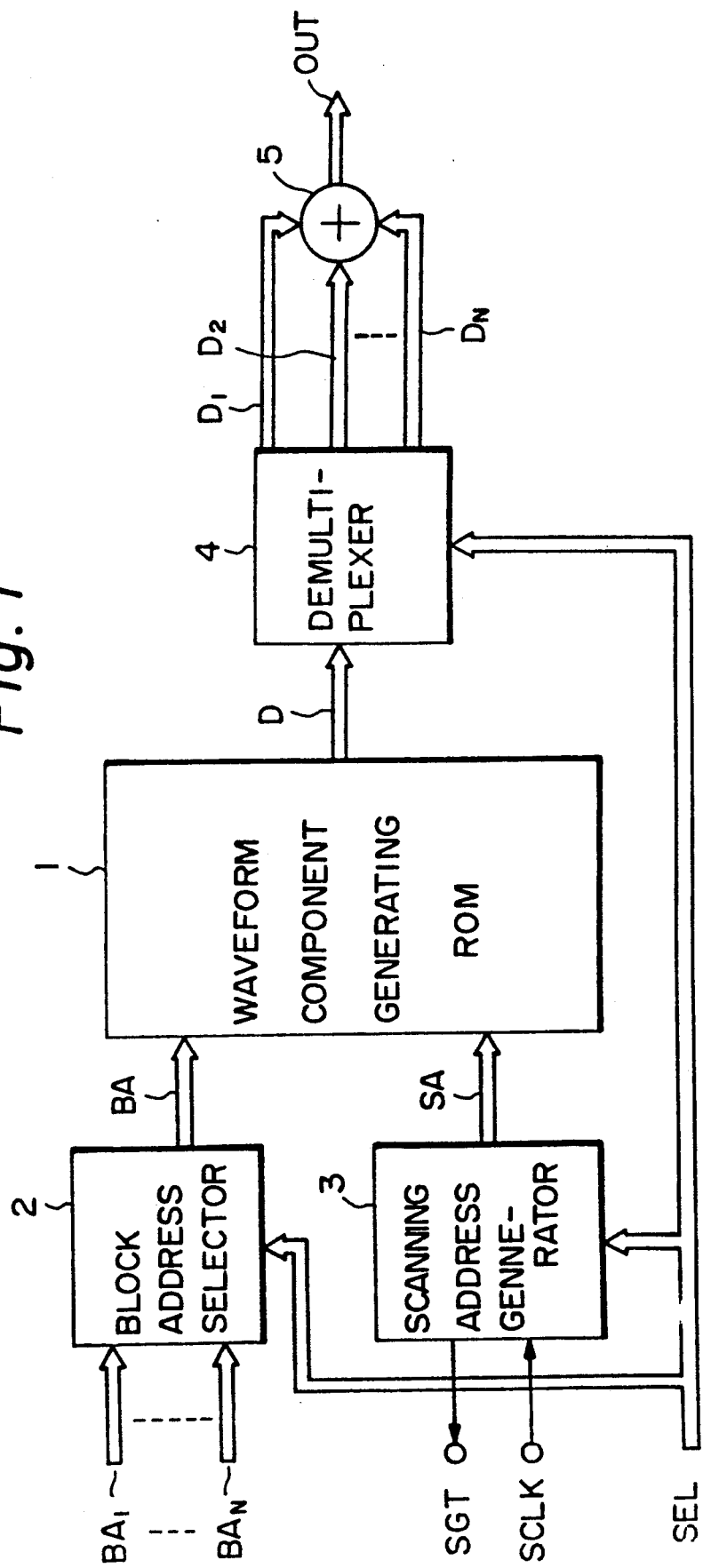
FIG. 1 is a block diagram illustrating an embodiment of the present invention.

With reference to FIG. 1 illustrating an embodiment of the present invention, reference numeral 1 indicates a waveform component generating ROM which has prestored therein an arbitrary one of the band-restricted N-nary waveform components (hereinafter referred to as waveform component) of an N-symbol period (hereinafter referred to as a symbol group). Each memory block in this ROM wherein the band-restricted N-nary waveform (component) outputs are stored and the order of time series are specified by a block address BA and a scanning address SA provided from the outside, respectively.

Assume that the waveform component prior to the band restriction (hereinafter referred to as a waveform component input), from which the above-mentioned waveform component output is derived, is a sequence of [k/N] (where "x" is the smallest integer greater than x and k is the symbol length of an impulse response determined by the band restriction) waveforms which has M kinds of patterns (hereinafter referred to as elementary waveforms) defined on a one-symbol group.

To facilitate a better understanding of the invention, a description will be given, with reference to FIGS. 2A and 2B, of the above-mentioned elementary waveforms which are used in the invention in the case of the four-level (i.e. M=4) depicted in FIG. 4.

Figure 2A:
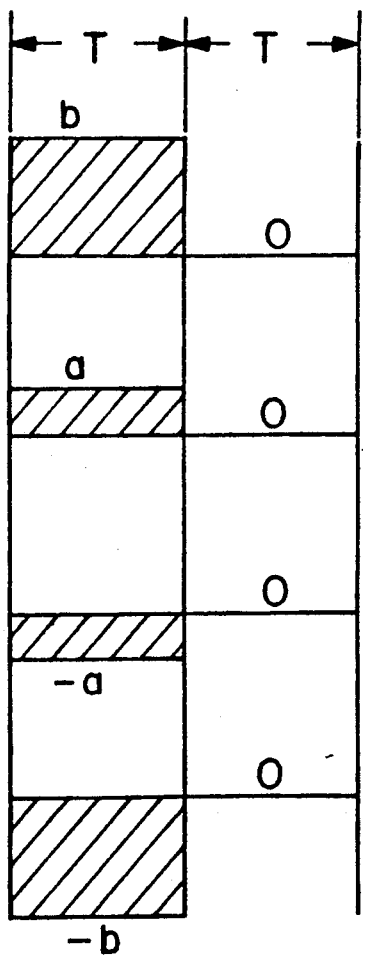
FIGS. 2A and 2B are diagrams showing examples of an elementary waveform prior to band restriction which are used in the present invention.
Figure 2B:
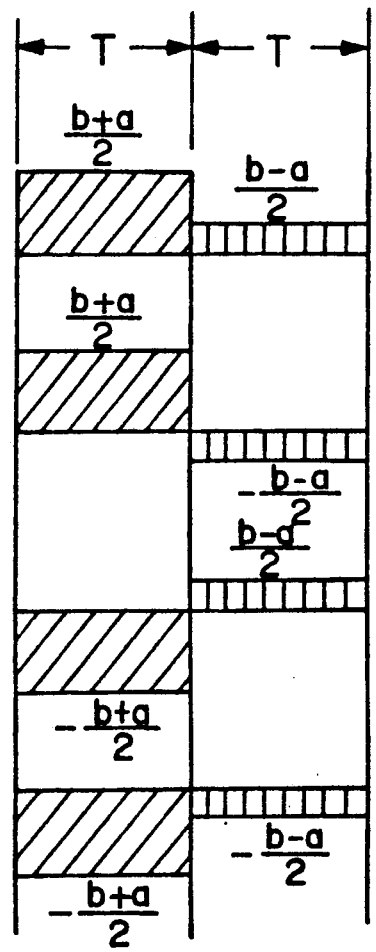

In FIGS. 2A and 2B the one symbol group, on which defines the elementary waveform is defined, consists of two symbol (N=2) periods. FIG. 2A shows the case of employing the elementary waveforms each of which takes one of four levels from the four-level ($\pm b$, $\pm a$) square waveforms depicted in FIG. 4 on the one symbol period (indicated by hatching) and takes the value zero on the other symbol period. FIG. 2B shows the case of employing the elementary waveforms, each of which takes one group of specified levels ($\pm(b+a)/2$) on the one symbol period (indicated by hatching) and takes the other group of specified levels ($\pm(b-a)/2$) on the other symbol period (indicated by vertical lines), and the sum of the specified levels on the both symbol periods is equal to any one of the four-level ($\pm a$, $\pm b$) shown in FIG. 4.

Figure 4:
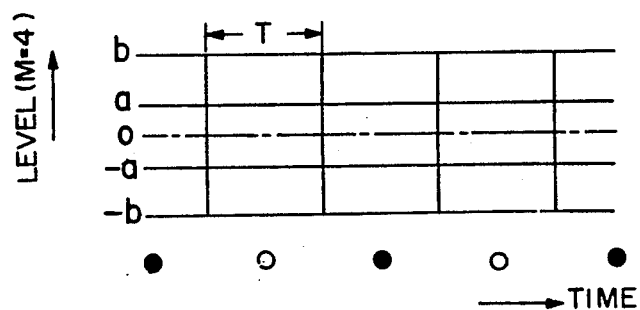
FIG. 4 is a diagram showing an example of an M-value signal sequence (a square wave sequence in the case of M=4).

FIG. 4 shows an example of a multi-level (M-level) signal sequence from which an M-level, band-restricted waveform is derived by band restriction.

The example shown in FIG. 4 is a four-level (M=4) square wave sequence and has level values $\pm a$ and $\pm b$ ($b>a>0$), and the sequence is composed of square waves which assume any one of the four levels for each period of one symbol length (T). In FIG. 4 the abscissa represents time and the ordinate level.

For producing a multi-level band-restricted waveform through band restriction of a multi-level square wave sequence of, for example, two or more levels ($M \geq 2$) as depicted in FIG. 4.

In the both cases of FIGS. 2A and 2B, the order of the elementary waveforms in the first and second symbol periods may also be reverse to the order shown.

As can easily be understood from the above, the construction of the above-mentioned elementary waveform is also possible in signal sequence other than those of $M=4$ and $N=2$ as shown in FIGS. 2A and 2B.

Further, M kinds of elementary waveforms can be uniquely represented by digits of M values ("$\log_2 M$" bits). Accordingly, a train of [k/N] elementary waveforms, that is, the waveform component input, can be represented by [k/N] digits ("$\log_2 M$" bits per digit), so that the waveform component generating ROM 1 is constructed by prestoring the band-restricted waveform of a band-restricted [k/N]-th symbol group of the waveform component input in a memory block specified by the block address BA which is the M-value series of the [k/N] digits corresponding to the waveform component input.

Incidentally, since the time length corresponding to the sequence of [k/N] elementary waveforms is longer than the symbol length of the impulse response (k symbols), it is possible to generate a waveform component output which sufficiently reflects the band restriction (i.e. intersymbol interference) effect.

Reference numeral 2 in FIG. 1 denotes a block address selector which receives N sets of block addresses $BA_1, \ldots, BA_N$ each composed of an M-value signal sequence having a length of [k/N] digits, selects one of them in response to an external 1 out of N selecting signal SEL and provides the selected block address BA to the waveform component generating ROM 1 to specify the memory block to be read out.

Figure 3A:
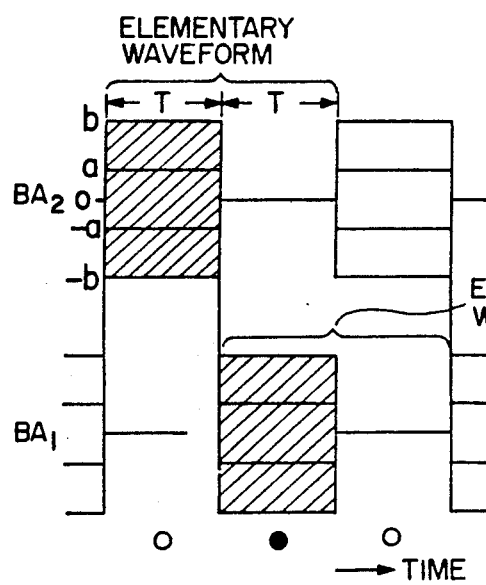
FIGS. 3A and 3B are diagrams showing examples of a block address which are used in the present invention.
Figure 3B:
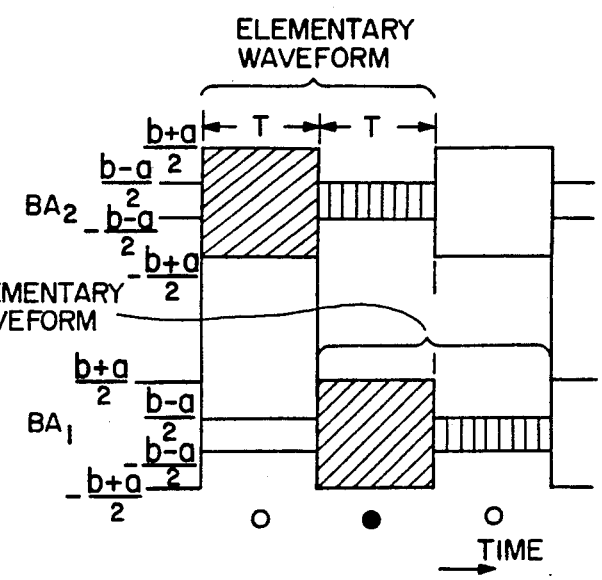

FIGS. 3A and 3B show, by way of example, the formation of the block addresses $BA_1, \ldots, BA_N$ in the case where $M=4$ and $N=2$.

FIG. 3A shows the case of using, as the elementary waveform, the square wave depicted in FIG. 2A. In this instance, the block addresses are formed so that four-level square wave components, which are waveform component inputs specified by the block addresses $BA_1$ (indicated by the black circle) and $BA_2$ (indicated by the white circle) ($=BA_N$), are made equal to four-level square wave portions of $[k/N]=[k/2]$ odd symbols (indicated by the black circle) and even symbol (indicated by the white circle) in a four-level square wave sequence shown in FIG. 4 respectively.

FIG. 3B shows the case of using, as the elementary waveform, the square wave depicted in FIG. 2B. In this instance, the block addresses are formed so that four-level ($\pm b, \pm a$) square wave portions, obtained by the additions of the waveform component inputs specified by the block addresses $BA_1$ and $BA_2$, are made equal to four-level portions of the odd symbol (the black circle) and the even symbol (the white circle) in FIG. 4, the binary square wave portions with the levels $\pm(b+a)/2$ of one waveform component being added to the binary square wave portions with the levels $\pm(b+a)/2$ of the other waveform component. It is evident that the above-described formation of the two block addresses $BA_1$ and $BA_2$ is uniquely determined for the arbitrary four-value square wave sequence shown in FIG. 4 in both cases of FIGS. 3A and 3B, and the block addresses $BA_1$ and $BA_2$ can easily be derived from the M-value ($M=4$) signal sequence representing the four-value square wave sequence of FIG. 4, by means of a proper encoder using a combinational logic circuit (not shown).

Turning back to FIG. 1, reference numeral 3 denotes a scanning address generator which receives a sampling clock signal SCLK from the outside, frequency-divides it to produce a scanning address SA having a period of one symbol group and provides the scanning address to the waveform component generating ROM 1 to scan the memory block specified by the afore-mentioned block address BA, and which outputs a symbol group timing signal SGT similarly indicating one period of one symbol group to outside and clearly representing the timing of the symbol group and responds to the afore-mentioned 1 out of N-selecting signal SEL to shift the value of the scanning address SA for a 1/M period (one symbol period) on a time-shared basis.

Reference numeral 4 denotes a demultiplexer which, according to the 1 out of N-selecting signal SEL, demultiplex of the waveform component output D read out of the waveform component generating ROM 1 into N data outputs $D_1, D_2, \ldots, D_N$ while temporarily storing and outputting them in parallel. Reference numeral 5 denotes an adder which receives the N data outputs $D_1, D_2, \ldots, D_N$ of the demultiplexer 4 and outputs their added value, as a desired multi-level band-restricted waveform (OUT), to the outside.

Next, the operation of the FIG. 1 embodiment according to the present invention will be described.

In FIG. 1, the sum of waveform component inputs specified by the N block addresses $BA_1, \ldots, BA_N$ which are input into the block address selector 2 is equal to such a M-level square wave sequence as shown in FIG. 4 ($M=4$) and the band restriction processing is linear. It is evident, therefore, that the desired multi-level band-restricted waveform could also be obtained even by individually band-restricting the waveform component inputs specified by the block addresses $BA_1, \ldots, BA_N$ and then adding them. The present invention performs such a process on a time-shared basis.

That is, the band-restricted waveform components (i.e. the waveform component outputs) corresponding to the N waveform component inputs, which are specified by the block addresses $BA_1, \ldots, BA_N$, are read out of the waveform component generating ROM 1 when the block addresses $BA_1, \ldots, BA_N$ are selected on a time-shared basis in accordance with the 1 out of N-selecting signal SEL and sequentially applied as the block address BA to the waveform component generating ROM 1 to specify the memory block to be read out and the block is scanned by the scanning address SA. The waveform component outputs thus read out one after another are converted by the demultiplexer 4 into parallel outputs, which are added by the adder 5 into the desired multi-level band-restricted waveform OUT.

It is apparent from the above that an analog waveform of the multi-level band-restricted wave could be obtained by storing and holding the output value OUT of the adder 5 once in an external register (not shown) and then converting it into analog form through use of D/A converter (not shown).

Incidentally, it is necessary that the N waveform component inputs which are specified by the block addresses $BA_1, \ldots, BA_N$, shown in FIG. 3, have their elementary waveforms in FIG. 2 (the portions indicated by the hatching and the vertical lines in FIG. 3) shifted from each other by a 1/N period (i.e. one symbol period). To perform this, N kinds of scanning addresses shifted by the 1/N period (i.e. one symbol period) relative to each other are selected according to the 1 out of N-selecting signal SEL on a time-shared basis and supplied as the scanning address SA to the waveform component generating ROM 1 by the scanning address generator 3.

The symbol group timing signal SGT which is output from the scanning address generator 3 is used for generating the block addresses $BA_1, \ldots, BA_N$, each of which is updated every other symbol period and held for one symbol group period.

The waveform component generating ROM 1 in FIG. 1, which is used in the multi-level band-restricted waveform generator of the present invention which performs the above-described operation, generates the waveform for each symbol group (i.e. an N-symbol period), so that, letting the number of samples per one symbol period be represented by S, the memory capacity of the ROM is $(N \cdot S) \cdot M^{[k/N]}$ words.

Here, $$[k/N] = \{kt(N - k_{modN})\}/N \qquad (1)$$

(where $x\, mod_N$ is the residue when x is divided by N.) the following equation holds:

$$(N \cdot S) \cdot M^{k/N} \leq (N \cdot S) \cdot M^{[k/N]} \qquad (2)$$
$$< (N \cdot S) \cdot M^{[(k/N)+1]}$$

Now, to estimate the memory capacity in the case of employing the block addresses $BA_1$ and $BA_2$ ($=BA_N$) of FIG. 3 (N=2) corresponding to the case of M=4 shown in FIG. 4, it becomes $2S \cdot 2^k$ to $8S \cdot 2^k$ words according to Eqs. (1) and (2).

This capacity is compressed $2^{k-1}$ to $2^{k-3}$ times smaller than the capacity, $S \cdot M^k = S \cdot 2^{2k}$ words needed in the conventional waveform table ROM method in which a band-restricted waveform is derived directly from, for example, the four-value square wave sequence depicted in FIG. 4 and stored in the waveform table ROM. It will be understood that the effect of compression increases exponentially as k increases.

As described above in detail, according to the present invention, the multi-level band-restricted waveform generating process is based upon firstly generating N sets of band restricted waveform components on time-shared basis and secondary adding them. Hence, the present invention is free from the problems of size, costs and stability encountered in the conventional analog or digital filtering method and also diminishes the defect of a remarkable increase of the memory capacity experienced in the conventional waveform table ROM method. Accordingly, the invention is easy to implement.

What we claim is:

1. A multi-level band-restricted waveform generator for deriving a multi-level band-restricted waveform from an M-level (a natural number, M−2) signal sequence, comprising:

a read-only memory wherein M kinds of waveforms on N symbol periods define one symbol group, each of which takes one of M levels from said M-level signal sequence on one symbol period and takes the value zero on all the other (N−1) symbol periods in said one symbol group, are used as elementary waveforms, the band-restricted waveform of (k/N)-th symbol group (where (K/N)=(x) is the smallest integer greater than x and k is the symbol length of an impulse response determined by said band restriction) corresponding to a sequence of (k/N) elementary waveforms is precalculated as waveform components, and said waveform components are stored in a memory block identified by block addresses each composed of an M-level sequence with a length of (k/N) digits corresponding to said sequence of (k/N) elementary waveforms, in the order of time series specified by an additional scanning address;

a block address selector wherein N sets of M-level signal sequences for specifying the first to the N-th sequences each including (k/N) elementary waveforms, formed so that the sum of said elementary waveforms of each set is equal to said M-level signal sequence, are selected on a time-shared basis and provided as said block addresses to said read-only memory;

a scanning address generator wherein N scanning addresses shifted from each other by a 1/N period (one symbol period) are selected on a time-shared basis in synchronization with the time-shared selection of said block addresses and provided as said additional scanning addresses to said read only memory;

a demultiplexer wherein N parallel outputs are obtained by demultiplexing N waveform components read out of said read-only memory on a time-shared basis; and an adder wherein said outputs are added together and output as said multi-level band-restricted waveform.

2. A multi-level band-restricted wave form generator for deriving a multi-level band-restricted waveform from M-level (a natural number, M−2) signal sequence, comprising:

a read-only memory wherein M kinds of waveforms on N (plural) symbol periods defined as one symbol group, each of which takes specified levels on each symbol period on said one symbol group so that the sum of said specified levels of said one symbol group becomes equal to any one of M levels from said M-level signal sequence, are used as elementary waveforms, the band-restricted waveform of (k/N)-th symbol group (where (K/N)=(x) is the smallest integer greater than x and k is the symbol length of an impulse response determined by said band restriction) corresponding to a sequence of (k/N) elementary waveforms is precalculated as waveform components, and said waveform components are stored in memory blocks identified by block addresses each composed of an M-level sequence with a length of (k/N) digits corresponding to said sequence of (k/N) elementary waveforms, in the order of time series specified by an additional scanning address;

a block address selector wherein N sets of M-level signal sequences for specifying the first to the N-th sequences each including (k/N) elementary waveforms, formed so that the sum of said elementary waveforms of each set is equal to said M-level signal sequence, are selected on a time-shared basis and provided as said block address to said read-only memory;

a scanning address selector wherein N scanning addresses shifted from each other by a 1/N period (one symbol period) are selected on a time-shared basis in synchronization with the time-shared selection of said block addresses and provided as said additional scanning addresses to said read-only memory;

a demultiplexer wherein N parallel outputs obtained by demultiplexing N waveforms components read out of said read-only memory on a time-shared basis; and an adder wherein N parallel outputs are added together and output as said multi-level band-restricted waveform.

* * * * *